United States Patent

Ward et al.

[11] Patent Number: 5,071,132
[45] Date of Patent: Dec. 10, 1991

[54] MOLECULAR STRUCTURE GAME

[76] Inventors: Elvis G. F. Ward, 506 Eastern Parkway #C-1, Brooklyn, N.Y. 11225; George Spector, 233 Broadway Rm 3815, New York, N.Y. 10007

[21] Appl. No.: 643,135

[22] Filed: Jan. 17, 1991

[51] Int. Cl.⁵ .................. A63F 3/00; G09B 23/24
[52] U.S. Cl. ........................... 273/243; 273/276; 434/298
[58] Field of Search ............. 273/276, 256, 243, 236, 273/272; 434/298, 278, 279

[56] References Cited

U.S. PATENT DOCUMENTS

| 3,423,093 | 1/1969 | Lahav | 273/282 R |
| 4,190,255 | 2/1980 | Hughes | 273/272 |
| 4,801,147 | 1/1989 | Miller | 273/276 |

FOREIGN PATENT DOCUMENTS

WO86/01736  3/1986  PCT Int'l Appl. .......... 273/256

Primary Examiner—Benjamin Layno

[57] ABSTRACT

A molecular structure game is provided for creating chemical compounds which are taken from playing cards that are played out by using element hexagon-shaped marker pieces on four pyramid-like areas of connecting multi-hexagon spaces on a game board. The elements are chosen by moving playing pieces along a continuous path around the game board perimeter.

4 Claims, 1 Drawing Sheet

MOLECULAR STRUCTURE GAME

BACKGROUND OF THE INVENTION

The instant invention relates generally to board games and more specifically it relates to a molecular structure game which provides creating chemical compounds during the play of the game.

There are available various conventional board games which do not provide the novel improvements of the invention herein disclosed.

SUMMARY OF THE INVENTION

A primary object of the present invention is to provide a molecular structure game that will overcome the shortcomings of the prior art devices.

Another object is to provide a molecular structure game that utilizes the creating of chemical compounds which is played out on four pyramid-like areas of connecting multihexagon spaces.

An additional object is to provide a molecular structure game in which the playing pieces travel around a perimeter of block spaces that each randomly contain two separate elements with even and odd atomic numbers which when landed on can be utilized in creating a compound formula taken from a playing card.

A further object is to provide a molecular structure game that is simple and easy to use.

A still further object is to provide a molecular structure game that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
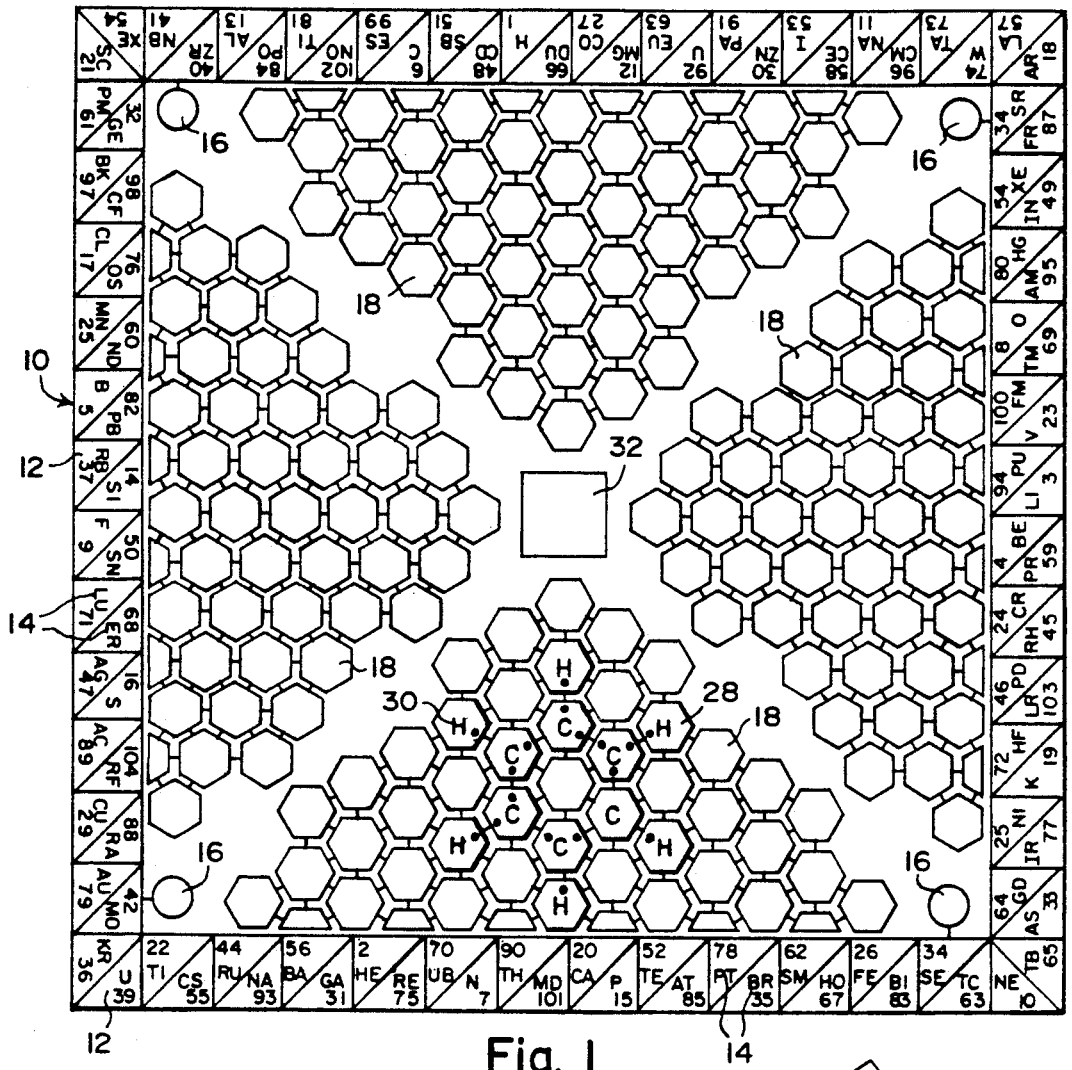
FIG. 1 is a plan view of the game board illustrating the pattern of the playing area according to the invention.
Figure 3:
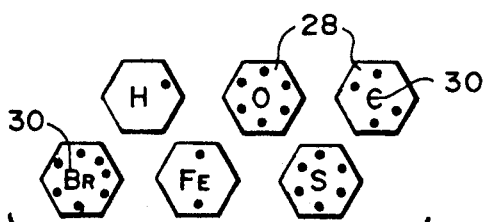
FIG. 3 is a plan view showing a plurality of hexagon shaped marker pieces which represent a separate element on both sides.
Figure 2:
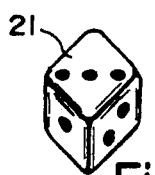
FIG. 2 is a perspective view of the playing die.
Figure 4:
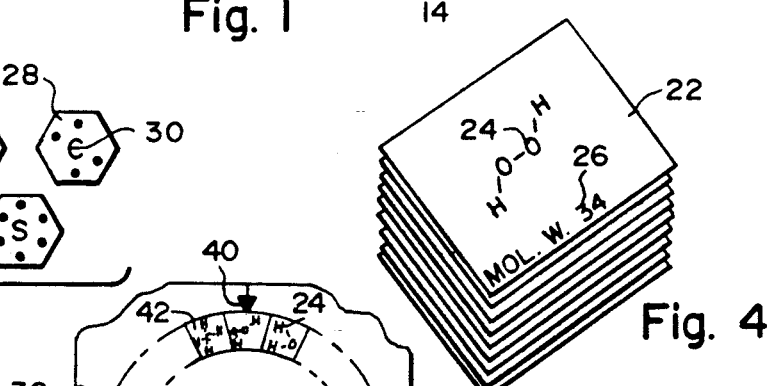
FIG. 4 is a perspective view of a pack of playing cards with each having the structured formula of a compound and its molecular atomic weight thereon.
Figure 6:
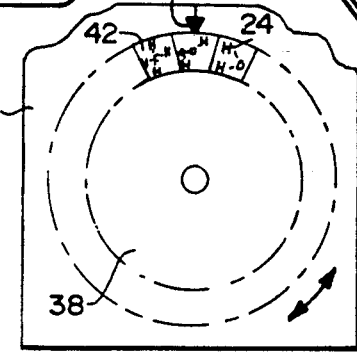
FIG. 6 is a plan view of a random playing card indicator wheel.
Figure 5:
FIG. 5 is an elevational view of one of the playing pieces.

Turning now descriptively to the drawings, in which similar reference characters denote similar elements throughout the several views, the Figures illustrate a molecular structure game which consists of a game board 10 having a continuous path around its perimeter divided into consecutive block spaces 12 bearing two randomly distributed separate elements 14 with an even and odd atomic number, four starting spaces 16 each located at one corner thereof and four pyramid-like areas of connected multi-hexagon spaces 18. Four playing pieces 20 are also provided, with one for each of the game players. The playing pieces 20 are of a size to fit within each of the block spaces 12. A die 21 indicated the amount of block spaces 12 each playing pieces 20 must travel upon. A deck of playing cards 22, is also utilized with each card 22 having a compound formula 24 and a corresponding molecular weight 26 thereon. A plurality of hexagon-shaped marker pieces 28 are used and have random element identifications 30 thereon, the marker pieces 28 are to be allotted in equal amounts to each of the players, so that they can be utilized for placement upon the multihexagon spaces 18 for structuring the compound formula 24 from one playing card 22.

The game board 10 further includes a playing card area 32 for storing the deck of playing cards 22 face up so that each playing card 22 can be utilized during the play of the game. Each playing piece 20 and some of the marker pieces 28 are color coded to represent the different game players.

An indicator 34 is for randomly choosing each playing card 22 during the play of the game. The indicator 34 has a base 36, a rotating wheel 38, a pointer 40 and removable wedges 42 with a different compound formula 24 on each wedge 42 to indicate which playing card 22 is to be used first during the play of the game.

Rules For Playing The Molecular Structure Game

1. For two to four players ages ten and up.
2. Each player will use a playing piece 20 and receive thirty playing markers 28 representing a separate element on each side. The playing piece 20 and the playing markers 28 will be colored according to the multi-hexagon spaces 18 in each pyramid-like area.
3. The playing cards 22 are shuffled and stacked in the playing card area 32 in the center of the game board 10.
4. Each player throws the die 21 to determine who gets the highest number. The sequence of the players are determined by the number they obtain.
5. Each playing piece 20 will commence at the right hand corner of the game board 10 and will move clockwise. The amount of spaces a player will advance at their turn to play, is determined by the number thrown on the die 21. The object is to land on a block space 12 with an element 14 needed to structure the formula of the playing card 22 on display. If the playing piece 20 is within six spaces of the element desired, then advancement is optional.
6. Once a playing piece 20 lands on the needed element 14, the player begins structuring the formula on the playing area assigned to the player and also get another turn to play. If a one is thrown, the same element 14 is secured again, if needed. Otherwise, the playing piece 20 will advance the number of spaces thrown on the die 21.
7. Any playing piece 20 landing on a starting point 16 during the game, has an option to go forward seven block spaces 12 or backward seven block spaces 12, conditionally upon whether the die number thrown is odd or even.
8. The first player to complete the structure of the formula 24 wins the playing card 22 and scores points indicated by the molecular weight 26 of the formula. The playing markers 28 are then removed from the game board 10 and the next formula is played for.

9. The game ends when all the playing cards 22, or a pre-arranged number of playing cards, are won. The player who acquires the highest score is the winner.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A molecular structure game which comprises:
   a) a game board having a continuous path around its perimeter divided into consecutive block spaces bearing two randomly distributed separate elements with an even and odd atomic number, four starting spaces each located at one corner thereof and four pyramid-like areas of connecting multi-hexagon spaces;
   b) four playing pieces, with one for each of the game players, said playing pieces being of a size to fit within each of the block spaces;
   c) a die to indicate the amount of block spaces each said playing piece must travel upon;
   d) a deck of playing cards, with each card having a compound formula and a corresponding molecular weight thereon, said compound formula having elements corresponding to elements on said block spaces; and
   e) a plurality of hexagon-shaped marker pieces, each piece having random element identifications thereon corresponding to an element on said block spaces, said marker pieces are to be allotted in equal amounts to each of the players, and utilized for placement upon the multi-hexagon spaces for structuring the compound formula from one said playing card.

2. A molecular structure game as recited in claim 1, wherein said game board further includes a playing card area for storing said deck of playing cards face up for utilizing each card during the play of the game.

3. A molecular structure game as recited in claim 2, wherein each said playing piece and some of said marker pieces are color coded to represent the different game players.

4. A molecular structure game as recited in claim 3, further comprising an indicator for randomly choosing each said playing card during the play of said game.

* * * * *